Patented Aug. 10, 1954

2,686,193

UNITED STATES PATENT OFFICE 2,686,193

PROCESS FOR TREATING GLYCERIDIC OILS AND FATS

Byron M. Watson, El Monte, Calif.

No Drawing. Application September 1, 1948,
Serial No. 47,339

3 Claims. (Cl. 260—428)

The present invention relates to a process for treating glyceridic oils and fats and more especially to the clearing of the oil matter extracted from the meats prior to refining the oil.

An important object of the invention is to provide a novel process for treating glyceridic oils and fats whereby to effect improved oil recovery and economy in operation.

Another object of the invention is to provide a process wherein the refining loss in the oil treatment is substantially reduced.

A further object of the invention is to provide a treatment which will facilitate the expression of the meats.

Still another object is to provide a process wherein conventional steps in the treatment of such matters may be eliminated.

A still further object of the invention is to provide a novel process which will improve the color of the refined product.

Other objects and advantages of the invention will become apparent as the description progresses.

Generally speaking, the process is directed to the clearing of the extraction, that is, the matter extracted from the meats or seeds as by expeller or hydraulic expression or by solvent extraction to remove therefrom non-oil constituents, including unextracted meat particles, gums and other impurities and particularly substances which are water-absorbent.

I have found that by treating such extraction with water in a particular state and under particular conditions, including quantity as related to the quantity of the non-oil constituents to be removed from the extracted oil, temperature and duration of treatment that certain heretofore commonly employed steps may be eliminated with a better yield of refined oil.

For example, in treating cocoanut oil under the new process, the extraction from the press, obtained by a conventional expeller, and which contains finely divided, unextracted meat particles in addition to other non-oil constituents, such as gums and the like, is brought to a temperature of 150° F.

As this extraction is conducted through the pipe line which carries it to the storage tank, the treating water in the state of steam, is introduced therein. Since the quantity of steam is to be based upon the quantity of water absorbent non-oil constituents to be removed the quantity of such non-oil constituents is initially determined, as by testing a portion of the extraction prior to the steam treatment. After determination of the average unextracted meat content, a filtered sample is subjected to the Gardner Break Test which shows that, on an average, non-oil constituents of the extracted matter run as follows: Cocoanut oil, 0.2%; cotton seed oil 0.5%; linseed oil 0.5%; and soy bean oil 1.25%. This is highly important since I have found that the quantity of water introduced into the extraction should approximate but not exceed twice the quantity of the water-absorbing non-oil constituents therein. It is equally important that the water be introduced in the form of dry or superheated steam.

Thus, a quantity of dry steam nearly twice that of the predetermined quantity of non-oil constituents, is introduced into the extraction under a boiler pressure of approximately 100 pounds per square inch, and at a temperature of about 338° F., advantageously by fitting a Venturi tube into the pipe line to control the quantity of extraction flow and introducing the steam through an orifice immediately back of Venturi tube on the high pressure side to control the steam flow. Such introduction of the steam causes agitation and turbulence of the fluid in the pipe line under very good control conditions. The agitation of the oil may be continued by agitating the fluids in the storage tank by mechanical or other means. The use of dry steam under the above described conditions effects intimate contact of finely divided particles of water vapor with the non-oil constituents which are quickly penetrated or wetted and absorb the aqueous moisture without the formation of an excess of water in the oil, thereby precluding emulsification of the oil and the water absorbed non-oil constituents or free water.

Therefore, the temperature and quantity of the steam and duration of steam introduction are controlled to obviate charring or decomposition of matter in the extracted oil.

The thus treated extraction is then cooled or brought to a temperature suitable to cause coagulation of the water wetted non-oil constituents. Complete coagulation of the non-oil constituents for cocoanut, cottonseed and soy bean oil takes place at a temperature of 120° F. or below, while coagulation in linseed oil takes place at a temperature of approximately 90° F. or below.

Thereafter, the suspended solids of unextracted meats and precipitated non-oil constituents are separated from the oil. Satisfactory separation is effected by centrifugation.

The conditions of operation are not limited to the foregoing and may be varied in accordance with the apparatus employed and matter treated. Thus, the temperature of the extraction at time of steam introduction may vary from 60 to 212° F. or from atmospheric to boiling and steam temperatures controlled to obviate discoloration.

When the extracted matter contains a relatively large proportion of unextracted meat particles it may be advantageous to initially treat the extraction, as by centrifugation, to remove the unextracted meats or a large part thereof and thereafter subject the resulting matter to the steam treatment for removal of the non-oil substances, gums and remaining meat particles. As a result of such steam treatment the clarification of the extraction prior to the refining thereof, the following advantages have been noted.

1. The non-oil constituents and unextracted meat particles may be removed as a result of a single operation and both are in better condition for mixing with the meats fed to the expeller.
2. The separation can be accomplished continuously and at a minimum of expense.
3. Whereas in the method heretofore used the unextracted meat particles contained large quantities of adhering oil to the detriment of the extracting operation, the meat particles removed under the present process are substantially free from adhering oil and contain a lesser quantity of absorbed oil and are, therefore, better adapted for admixture with the meats entering the expeller.
4. The novel steam treating process eliminates the need for the heretofore employed settling or screening operations and the filter press treatment, resulting in substantial saving in labor and equipment.
5. By removal of the non-oil constituents immediately after the extraction operation the coloring matters contained therein are not absorbed by the oil.
6. Removal of the precipitated non-oil constituents by my new process increases the value of the recovered oil since it precludes the emulsification and entrainment of neutral oil with the soap stock during the subsequent refining operation. The increased recovery of neutral oil can be appreciated by reference to the following analysis of representative samples of crude cottonseed oil, carried out in accordance with the Official Rules of the American Oil Chemists Society indicating samples of treatment without and with the new process.

*Crude hydraulic cottonseed oil*

|  | F. F. A. | Lye 14° | Loss | Color |
|---|---|---|---|---|
| Crude Hydraulic Cottonseed Oil | Percent 0.7 | Percent 5.6 | Percent 4.5 | 6.9 |
| Same sample after removal on non-oil constituents | 0.6 | 5.5 | 0.8 | 6.7 |

*Crude expeller cottonseed oil*

|  | F. F. A. | Lye 16° | Loss | Color |
|---|---|---|---|---|
| Crude Expeller Cottonseed oil | Percent 0.9 | Percent 7.0 | Percent 5.8 | 7.0 |
| Same sample after removal of non-oil constituents | 0.8 | 6.9 | 2.0 | 6.9 |

Prime crude soybean oil, having a Gardner break of 1.0% and showing a refining loss 12%, after removal of the non-oil constituents, shows a Gardner break of 0.0% and a refining loss approximately one percent above the free fatty acid content of the oil.

Linseed oil, after removal of the non-oil constituents, will alkali refine with a loss approximately one percent above the free fatty acid content of the oil.

7. The non-oil constituents precipitated in accordance with the above-described steam treatment do not dissolve in the oil when returned to the feed for further oil recovery.

It will thus be seen that the emulsification and entrainment of neutral oil in the soap stock, as has heretofore been the result, is to a large extent eliminated with consequent substantial saving of refined oil.

What is claimed is:

1. In the method of treating crude glyceride oils and fats to remove the non-oil impurities by the hydration of said impurities the steps which comprise treating the crude oil or fat obtained chiefly from the extractor and which has not been subjected to any substantial centrifuging or refining operation by injecting dry steam into the oil or fat at relatively small proportions and at a relatively low temperature to precipitate the hydrated non-oil constituents, and separating the hydrated non-oil constituents from the oil.

2. In the method of treating crude glyceride oils and fats to remove the non-oil impurities by the hydration of said impurities the steps which comprise treating the crude oil or fat obtained chiefly from the extractor and which has not been subjected to any substantial centrifuging or refining operation by injecting dry steam into the oil or fat without substantially deleteriously effecting the oil or fat to precipitate the hydrated non-oil constituents, and separating the hydrated non-oil constituents from the oil.

3. In the method of treating crude glyceride oils and fats to remove the non-oil impurities by the hydration of said impurities the steps which comprise treating the crude oil or fat obtained chiefly from the extractor and which has not been subjected to any substantial centrifuging or refining operation by injecting dry steam into the oil or fat without substantially deleteriously effecting the oil or fat to precipitate the hydrated non-oil constituents, cooling the oil to precipitate the hydrated non-oil constituents, and separating the hydrated non-oil constituents from the oil.

References Cited in the file of this patent

UNITED STATES PATENTS

| Number | Name | Date |
|---|---|---|
| 619,545 | Culmann | Feb. 14, 1899 |
| 1,448,581 | Turner | Mar. 23, 1923 |
| 1,737,402 | Ayres et al. | Nov. 26, 1929 |

FOREIGN PATENTS

| Number | Country | Date |
|---|---|---|
| 6,753 | Great Britain | May 1900 |